(12) United States Patent
Simpson et al.

(10) Patent No.: US 6,559,965 B1
(45) Date of Patent: May 6, 2003

(54) METHOD AND APPARATUS FOR ESTABLISHING TWO-WAY COMMUNICATION WITH A REMOTE PRINTER

(75) Inventors: Shell S. Simpson, Boise, ID (US); Richard Detweiler, Boise, ID (US); Matt Howell, Boise, ID (US); Mark E. Hodges, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/393,215

(22) Filed: Sep. 9, 1999

(51) Int. Cl.[7] .............................................. G06K 15/00
(52) U.S. Cl. ..................................... 358/1.15; 358/1.13
(58) Field of Search ........................ 358/1.1, 1.6, 1.13, 358/1.12, 1.14, 1.15, 442; 700/24, 17, 99; 710/1, 3, 7, 8, 9, 15, 20, 21, 36, 62, 65

(56) References Cited

U.S. PATENT DOCUMENTS 5,787,237 A    7/1998  Reilly .......................... 395/112
5,953,496 A  *  9/1999  Ishida et al. ................ 358/1.15

* cited by examiner

Primary Examiner—Arthur G. Evans
(74) Attorney, Agent, or Firm—Leslie G. Murray

(57) ABSTRACT

A method for establishing two-way communications between a host system and a device when the address of the device is initially unknown. The host system submits a job to a device with the job including address and other information required for the device to respond with the device's address. Once the host system has the device address, the host system and the device can establish bi-directional communications. In a print job, a print job language (PJL) command known as SOCKETPING is used to transmit the information between a print client and a printer. The SOCKETPING command includes fields for host system address family, protocol, address, and port as well as extensions to define job status reporting parameters. The printer responds to the SOCKETPING command with the necessary address information for the printer and job status reports as specified in the SOCKETPING extensions.

23 Claims, 3 Drawing Sheets

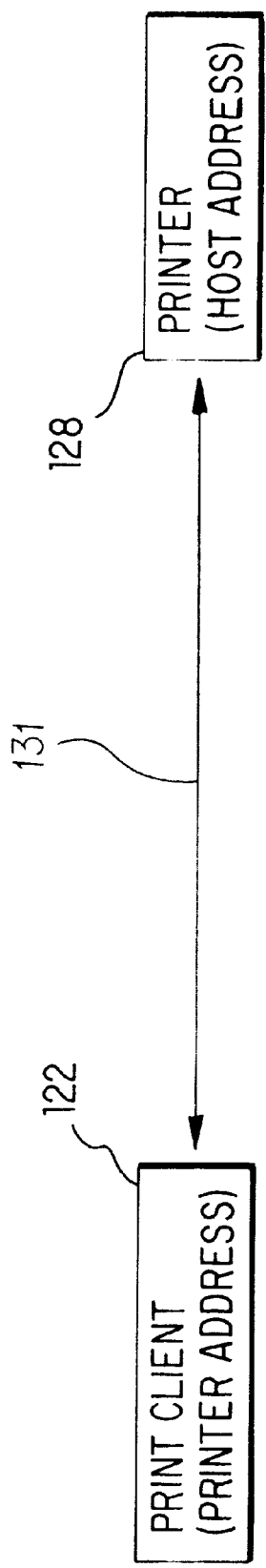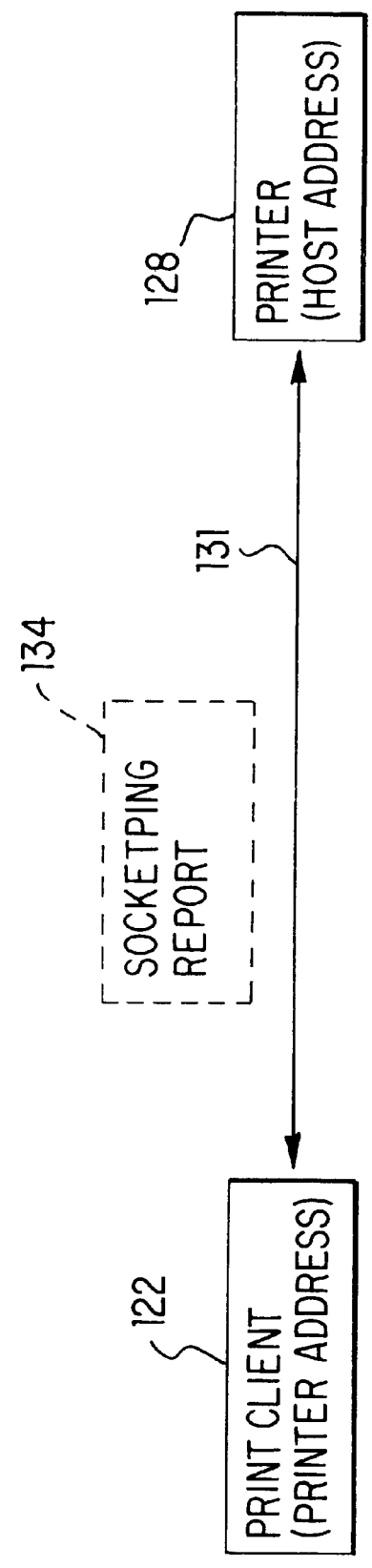

METHOD AND APPARATUS FOR ESTABLISHING TWO-WAY COMMUNICATION WITH A REMOTE PRINTER

FIELD OF THE INVENTION

The present invention is directed to a network printing system, and, more particularly, is directed to a method and print job command for establishing two-way communications with a remote printer having an unknown address and for requesting information from the remote printer.

BACKGROUND OF THE INVENTION

As the size of networked systems increases from a few connected computers located near each other to several thousand machines of various types and sizes scattered at great distances from each other, the demands on the network printers also increase. Additionally, the ability of host systems to communicate interactively with the network printers becomes increasingly important.

A printer is a peripheral device that can be shared on a network connected to a print server. Also, a printer can directly connect to the network by including a network interface card or the network interface in the printer which allows the printer to run its own print server software and function as a regular network node. In a typical Windows environment, for example, the network printer is a one-way printer. For a one-way printer, the only communication path is from the host computer to the printer without any ability for the printer to notify the host computer of the job status such as whether the print job has been successfully completed.

Typically, networks utilize printers treated as shared resources connected to the networks via print servers. Recently developed software programs have become available allowing the host systems or computers to communicate interactively with the network printers. With this capability, host resident printing software can accomplish tasks such as determining the configuration of the device automatically and reporting the status of a print job back to the submitting host or client system. Unfortunately, interactive or bidirectional communication with the network printer is not always possible. Printing has traditionally been oriented around delivering print jobs to a printer, rather than enabling interactive communication with the host that submitted the print job. Often, because of the manner in which the printer is coupled to the host system, the host may only submit jobs to the printer. Additionally, while the spooler resident on the host system can sometimes access printer status information, it may not provide a way for other host based printer software, such as the printer driver, for example, to communicate bi-directionally with the printer.

Typically, the network printer is a stand-alone peripheral device which is tasked to perform in an increasing number of network and non-network communication environments. In order for two devices to communicate, it is necessary that both parties support the same protocols and know how to find each other through some sort of address information. A printer and an interested host machine can both support the same protocol, but the printer may still be unable to communicate with the host because they lack knowledge of each other's address information.

Conventionally, printer address information is obtained by host software by inspecting the host system. In a Windows environment, for example, the host system maintains a registry of system information. This registry contains entries that describe each printer connection point (subsequently referred to as a port). The information maintained in these entries further depends on the type of printer connection point or port. However, the entry format associated with each type of port type is different. For some port types, it is possible to determine the network address information necessary to communicate bi-directionally with the printer; for other port types, the determination of the printer address information is difficult or impossible. For example, when the format of the data entry for the port type is not known, it is impossible to determine the address information for the associated printer. Also, when the port refers to a remote print server, it is impossible to obtain the printer address information unless some provision has been made by the remote print server to make the address information available to connected host or client systems.

Presently, host systems or print clients obtain print job status by periodically polling the printer. After the print job is sent to the printer, a job status agent, e.g., DocWise, is invoked to monitor the status of the job. This agent periodically checks the status of the print job by sending PML or SNMP requests to the printer. Although not typically used, such an agent could use SNMP traps to obtain asynchronous status updates; however, the number of print clients that can register for traps is limited which makes the use of traps unreliable.

The present practice of polling the printer to obtain job status presents several disadvantages. First, polling generates unnecessary network traffic. The job status agent may send SNMP requests to the printer only to determine that the status of the printer has not changed. If a print job ends abnormally, the job status agent may remain active continuing to poll even though the job it is polling for no longer exists. Second, polling results in delayed notification of job status. The job status agent only finds out about status changes when SNMP or PML requests are made to the printer. If the job agent only samples job status once a minute, it may be a long as a minute before the agent is notified of a change in the job status. Increasing the polling rate can reduce this problem; however, increasing the polling rate exacerbates the problem of unnecessary network traffic. Third, the use of traps to obtain asynchronous notification of job status changes is troublesome because of the limited number of print clients that can register for traps. Finally, in order to poll the printer for job status, the job agent must know the printer address.

What is therefore needed is a method and means of establishing direct two-way communication between a print client and a printer, and providing a request for print job status and other printer information from the printer without the need to periodically poll the printer.

SUMMARY OF THE INVENTION

In a preferred embodiment, the present invention may be implemented as a method to provide a network printer with the address of a print client to establish direct, two-way communications between the print client and the printer. Once two-way communications between the print client and the printer have been established, the print client and other interested parties may receive print job status directly without the use of a job status agent polling the printer or creating unnecessary network traffic.

In another preferred embodiment, the present invention may be implemented as a method of establishing two-way communication between a host system and a device in a network wherein one-way job submission communication between the host system and at least one device has been provided. In such a system, typically, the device address initially is unknown to the host system. In fact, the host system may only be aware of the address of a first server in a string of servers. The host system submits a job to a device with the job including information describing the host system's address. The job may be a typical job submitted in the course of the host system's routine operations, or, preferably, the job may be a special job containing only the information and instructions enabling the device to contact and respond to the host system after the device receives the special job. Once the device receives the job, it responds to the host system at the specified address and provides the host system with the device address thus allowing two-way communications to be established between the host system and the device.

In another preferred embodiment, the job submitted by the host system will include instructions requiring the device to perform other actions in addition to responding to the host system with the device address. For example, the additional instructions may require the device to report job status and/or device status to the host system. The instructions may also designate other destinations for the device to report to in addition to the host system.

Other aspects and advantages of the present invention will become apparent from the following detailed description, taken in conjunction with the accompanying drawings, illustrating by way of example the principles of the invention.

DESCRIPTION OF THE DRAWINGS

The present invention will be described with reference to the accompanying drawings in which like reference numbers indicate identical or functionally similar elements.

FIG. 2C is a simplified diagram illustrating the establishment of two-way communications between a host system and a device according to the principles of the present invention; and FIG. 2D is a simplified diagram illustrating data communication and status reporting between a host system and a device according to the principles of the present invention.

DETAILED DESCRIPTION OF THE INVENTION

Figure 1:
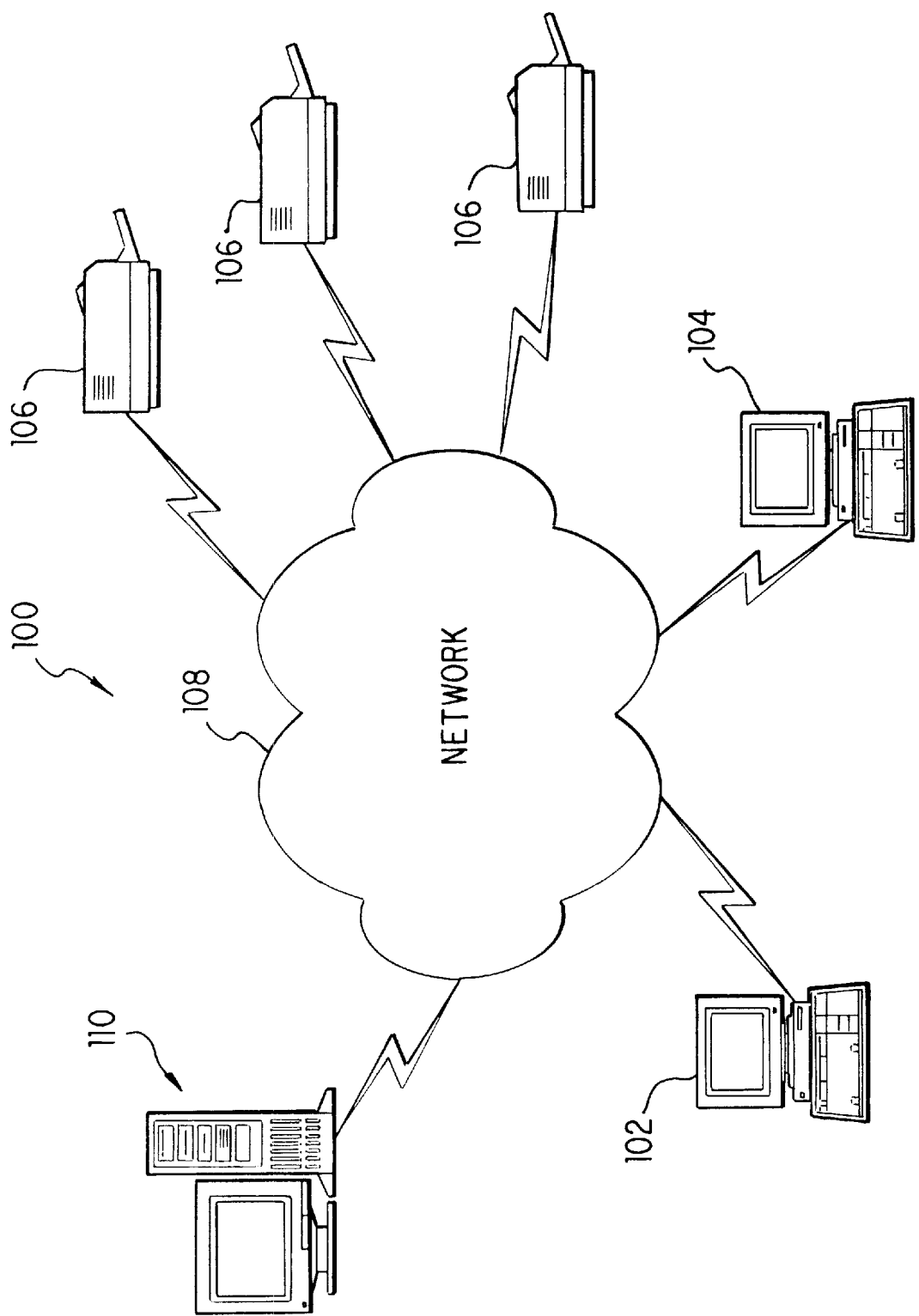
FIG. 1 is a simplified diagram of a network system for performing the method of the invention.

As shown in the drawings for purposes of illustration, the present invention is embodied in a computer network and method which enables a host system to establish two-way communications with a device when the address of the device is initially unknown to the host system. In addition to establishing bidirectional communications, the method of the present invention enables the host system to receive job and device status reports directly from the device automatically without periodically polling the device and generating unnecessary network traffic.

Referring now to FIG. 1, an exemplary network system 100 in which the invention can be used is shown. Generally, the network system 100 of FIG. 1 includes multiple (n) client (host) computers 102 and 104 and one or more networked devices 106, illustrated as printers. The client computers 102 and 104 communicate with the devices 106 over a data communications network 108. In the illustrated example, the data communications network 108 can include one or more of: the Internet, PSTN networks, local area networks (LANs), and private wide area networks (WANs). Communication between client computers 102 and 104 and devices 106 can be via any of a variety of conventional communication protocols. Client computers 102 and 104 transfer data or jobs to devices 106 via network 108. One or more servers 110 may also be coupled to communications network 108. The devices 106 of FIG. 1 can be any of a wide variety of conventional printing or other output devices. Such output devices can be physical devices, such as laser printers, inkjet printers, dot matrix printers, facsimile machines or plotters, for example; or software applications such as a facsimile program running on a computer, for example. Typically, in a network such as network system 100 communications between a client computer 102, for example, and a device 106 will be via one or more device servers 110.

Figure 2A:
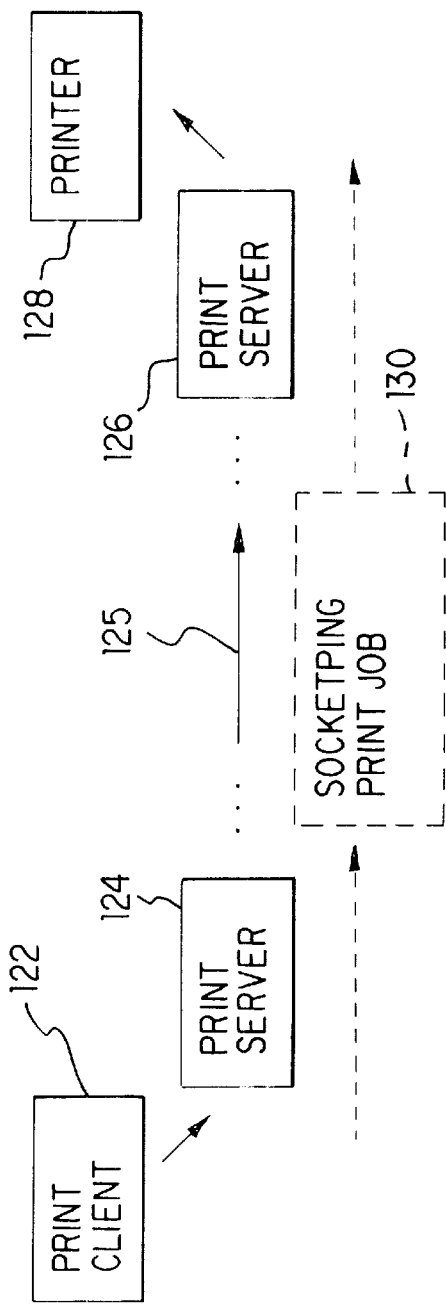
FIG. 2A is a simplified diagram illustrating a host system sending a special job to a device according to the principles of the present invention.
Figure 2B:
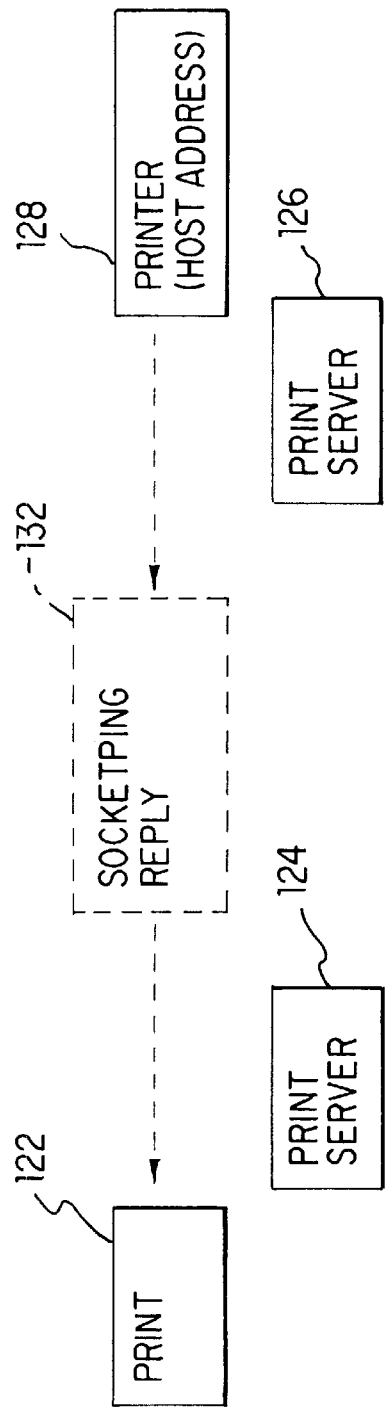
FIG. 2B is a simplified diagram illustrating the device of FIG. 2A responding to the host system.

Referring now also to FIGS. 2A, 2B and 2C, a preferred embodiment of the present invention is illustrated. A host system, referred to as a print client 122, sends a print job 130 to a network printer 128 via one or more print servers 124 and 126. Since printing has traditionally been oriented around delivering print jobs to a printer, typically it may be only possible for the host to submit print jobs to a printer because of the manner in which the printer is coupled to the print host. Furthermore, the print host does not know the printer address. Typically, the only information the print host has is the printer connection point within the host system (subsequently referred to as a port). In a network system, such as network system 100, the print host port may refer to a port at a remote print server which, in turn, refer to a port on yet another remote print server. In accordance with the principles of the present invention, when print job 130 is submitted to the network printer 128, the print job includes a set of instructions providing the printer with the print client 122 address information and printer response instructions. When the print job 130 arrives at the printer 128, the printer 128 extracts the necessary information to reply to the print client 122.

Preferably, the print job 130 contains a print job language (PJL) command known as SOCKETPING. The SOCKETPING command contains the necessary information for the printer 128 to respond to the print client 122. This information includes at least (1) a description of the print client 122 socket to which the printer 128 should reply and (2) a sequence number. (As is known in the art, a socket, or socket interface, is a mechanism that applications use to communicate.) When the print client 122 submits the SOCKETPING print job 130, via a unidirectional job submission path 125, it may pass through several print servers 124, 126 before it is received by the printer 128. Regardless of how the SOCKETPING print job 130 arrives at the printer 128, once the SOCKETPING print job is at the printer, the printer 128 extracts the necessary information required to respond to the print client 122. The SOCKETPING reply 132 sent by the printer 128 to the print client 122 contains at least the printer 128 address. Once the print client 122 receives the SOCKETPING reply 132, the print client 122 can establish a bidirectional communications path 131 thus allowing direct communications between the print client 122 and the printer 128, without the need to use the unidirectional print path 125. The print client 122 uses the sequence number to distinguish between responses received from several different printers 128. The print client 122 may have several outstanding SOCKETPING jobs at the same time and uses the sequence number to determine the particular SOCKETPING job (submitted earlier by the print client 122) corresponding to a particular SOCKETPING reply.

Once bidirectional communication has been established, the print client 122 can communicate directly with the printer 128 to send additional print job requests, and/or receive job status, printer configuration and status, and other information from the printer 128. While the bidirectional communicatin channel could be used to send present job data or additional print jobs, the uni-directional print path provided by the system operating system is typically utilized for this purpose. In a more general sense, bidirectional communication between a client host 122 and a device 128 provides the client host 122 with the capability to transfer data to the device 128 for various additional purposes, such as software or firmware updates or porting data to applications, for example. Further, the device 128 is capable of transferring data to a client host 122 for various purposes, such as facsimile transmission, for example.

The SOCKETPING job 130 includes any print job containing one or more PJL SOCKETPING commands. A SOCKETPING print job 130 may contain any number of PJL SOCKETPING commands; each PJL SOCKETPING command is processed independently by the printer 128. A SOCKETPING job 130 may also contain content, such as print data for a print job. The additional content is processed in the identical manner that it would be if no PJL SOCKETPING commands were present in the job content. Also, a SOCKETPING job 130 may simply contain one or more PJL SOCKETPING commands for execution by the printer 128 without any additional content.

The syntax of the SOCKETPING PJL command is as follows:
 @PJL SOCKETPING
  SEQUENCE=<Sequence#>
  FAMILY=<Family>
  PROTOCOL=<Protocol>
  ADDRESS=<Address>
  PORT=<Port>
Where:
 <Sequence#> is a 32 bit unsigned integer (represented as a string) that can be later used to match the present SOCKETPING job 130 with a subsequent SOCKETPING reply 132.
 <Family> is a string identifying the address family. For example, the following strings are currently defined for identifying the FAMILY:
  INET
  IPX
 <Protocol> is a string defining the address family to a specific protocol within that family. The legal values for this string depend on the family selected above:
  INET
   UDP
   TCP
  IPX
   IPX
   SPX
   SPXII
 <Address> is a string identifying a connection to the target machine or device. The legal values for this string depend on the family selected above:
  INET: aaa.bbb.ccc.ddd (for example, 15.56.40.210)
  IPX: NNNNNNNN:nnnnnnnnnn (for example, 0101A040:00001b498765)

<Port> is a string identifying the target service on the target machine at the ADDRESS specified. The legal values for this string depend on the family selected above:
  INET: 16 bit unsigned decimal integer
  IPX: 16 bit unsigned decimal integer The following is an example of a SOCKETPING PJL command:
 @PJL SOCKETPING SEQUENCE=1 FAMILY=INET PROTOCOL=UDP ADDRESS=15.56.40.210 PORT=3333

The preceding SOCKETPING PJL command would result in the printer 128 replying with a UDP packet, which would be sent to IP address 15.56.40.210 at UDP port 3333. The print client 122 would have to have a service listening on UPD port 3333 (bound to address 15.56.40.210) in order to receive the SOCKETPING reply 132.

The SOCKETPING reply 132 includes a variable sized buffer of text which may consist of a series of white space (space, tab, return) separated clauses in the following format:
 BUFFERSIZE=<BufferSize>
 SEQUENCE=<Sequence#>
 FAMILY=<Family>
 PROTOCOL=<Protocol>
 ADDRESS=<Address>
Where:
 <BufferSize> is a 32 bit unsigned integer (presented as a string) providing the size of the SOCKETPING reply in bytes. The size includes the "BUFFERSIZE=<BufferSize>." This value is used to determine if the SOCKETPING reply was broken into pieces and some of those pieces were lost. (For example, a UDP packet can be broken into several smaller packets in some circumstances.) If it is determined that the SOCKETPING reply is incomplete (for example, finding no BUFFERSIZE clause or receiving a buffer that is smaller that indicated by BUFFERSIZE), the SOCKETPING reply will be ignored.
 <Sequence#> is a 32 bit unsigned integer (represented as a string) that is used to match a SOCKETPING job with a corresponding SOCKETPING reply. The value of <Sequence#> is copied from the PJL SOCKETPING command that the printer is responding to. Legal values are defined above with reference to the PJL SOCKETPING command description.
 <Family> is a string is a string identifying the address family. The value of <Family> is copied from the PJL SOCKETPING command that the printer is responding to. Legal values are defined above with reference to the PJL SOCKETPING command description.
 <Protocol> is a string refining the address family to a specific protocol within that family. The value of <Protocol> is copied from the PJL SOCKETPING command that the printer is responding to. Legal values are defined above with reference to the PJL SOCKETPING command description.
 <Address> is a string providing the network address of the printer or device. The legal values for this string depend on the family selected above:
  INET: aaa.bbb.ccc.ddd (for example, 15.56.40.210)
  IPX: NNNNNNNN:nnnnnnnnnn (for example, 0101A040:00001b498765)

Unlike the PJL SOCKETPING command, the SOCKETPING reply does not include a clause specifying a port. A port identifies a target service. The print client requesting the address information is interested in obtaining the address of the printer—not the port associated with a specific service provided by the printer. A port was specified in the PJL SOCKETPING command to indicate where the SOCKETPING reply was to be sent.

Referring now also to FIG. 2D, once a bidirectional communications path 131 has been established between a client host, print client 122, for example and a device, printer 128, for example, data and other information can be exchanged directly between the two entities. In a preferred embodiment, print client 122 is able to receive print job and printer 128 status 134 directly without using the network 108 (as shown in FIG. 1) to periodically poll the printer 128. The print client 122 may make specific requests for printer 128 feedback during and between jobs, or, alternatively, print client 128 may include information in each print job 130 providing the printer 128 with a number of requests that the printer 128 will respond to automatically as a particular job proceeds.

In one preferred embodiment, one or more PJL SOCKETPING commands in SOCKETPING print job 130 will include extensions to provide additional instructions to the printer 138. For example, a printer 128 processes print jobs. Each print job is processed in steps or states. Reporting print job status includes reporting the entrance into and exit from each of these steps or states. As the printer 128 transitions into each of these states, it sends a SOCKETPING report 134 to all interested destinations (as specified in the PJL SOCKETPING command extensions). For example, three major types of print jobs may be identified: routine print jobs, retained jobs and jobs printed from disk (Kiosk printing, for example). For each of these different types of jobs, a variety of user perceivable steps or states can be identified. The following list identifies the various steps which may be involved in the processing of these types of jobs:

Receiving job data;
Storing page data;
retrieving page data; and
Printing the page or pages.

The above steps (as well as any additional steps which may be added to list) form the basis for reporting print job status as described above. This list is by way of example only and is not intended to be exhaustive.

As discussed above, preferably, one or more PJL SOCKETPING commands in the SOCKETPING job 130 will include various extensions providing additional instructions to the printer 128, for example, specifying print job status reporting requirements. The syntax of the PJL SOCKETPING command with the extensions to support print job status reporting is as follows:

@PJL SOCKETPING
  SEQUENCE=<Sequence#>
  FAMILY=<Family>
  PROTOCOL=<Protocol>
  ADDRESS=<Address>
  PORT=<Port>
  [JOBTRACKING=<JobTracking>
  [JOBTRACKINGLIFETIME=
    <JobTrackingLifetime>]]

Where:
<Sequence#>, <Family>, <Protocol>, <Address>, and <Port> are described above with reference to the PJL SOCKETPING command syntax.
<JobTracking> is an alpha-numeric value which describes the scope of the requested status reporting. If no JOBTRACKING clause is provided, job tracking will be disabled. The value for <JobTracking> specifies which events or states to track and report. For example, if <JobTracking> is "BASIC", the specified service (i.e., address and port in the PJL SOCKETPING command) will receive notification of all defined state transitions that the printer has the capability to report.

<JobTrackingLifetime> defines the term of the tracking and reporting. For example, a particular job may be printed once and discarded, or the job may be retained in storage for future repeated printing. The value of <JobTrackingLifetime> specifies whether or not job status for a job retained in storage is to be tracked after completion of the initial printing. This option has three possible values: "SUBMITTEDJOBOLNY", "RETAINEDJOBONLY" and "SUBMITTEDANDRETAINEDJOB". The value "SUBMITTEDJOBONLY" indicates that job tracking should only apply to jobs submitted from a host or client machine. The value "RETAINEDJOBONLY" indicates that job tracking should only apply to jobs that are being printed using job retention. The job was not submitted from a host machine; rather the job originated from the printer's memory (a hard disk, for example) and was initiated from the printer's control panel. The value "SUBMITTEDANDRETAINEDJOB" indicates that job tracking applies to both types of jobs. If the JOBTRACKINGLIFETIME clause is omitted, job tracking will apply only to jobs originating from a host machine. The JOBTRACKINGLIFETIME clause is a subordinate clause to the JOBTRACKING clause.

The brackets ("[ ]") indicate that the JOBTRACKING and JOBTRACKINGLIFETIME clause are optional.

The following is an example of a PJL SOCKETPING command that includes the extension for tracking job status:

@PJL SOCKETPING SEQUENCE=1 FAMILY=INET PROTOCOL=UDP ADDRESS=15.56.40.210 PORT= 3333 JOBTRACKING=BASIC

The preceding SOCKETPING PJL command would result in the printer 128 sending job status messages to IP address 15.56.40.210 at UDP port 3333. The print client 122 would have to have a service listening on UPD port 3333 (bound to address 15.56.40.210) in order to receive the SOCKETPING report 134 reporting job status. Because the JOBTRACKINGLIFETIME clause was omitted, job tracking will apply only to the job processed as a direct result of the print client 122 submitting the present job. If the present job results in a job retained in storage, job tracking will not be invoked in any future repeated execution of the job.

Job status and other printer information and status may be reported to any number of destinations in addition to the client host which initiated the print job. A separate PJL SOCKETPING command providing the necessary information is required for each destination for which reporting is desired.

Although the intended recipient for PJL SOCKETPING commands is the printer 128, PJL SOCKETPING commands may be utilized by other components of the printing system. For example, a server or spooler could "peek" at PJL SOCKETPING commands and use these to send job status information to the print client 122 (or to any destination specified in the PJL SOCKETPING command).

In response to the PJL SOCKETPING command described above, the printer 128 will send one or more SOCKETPING reports 134 reporting the requested job status and other information requested in the PJL SOCKETPING command extensions. The SOCKETPING report 134 is a special case of SOCKETPING reply 132 which includes job status and other information requested by the PJL SOCKETPING command included in the SOCKETPING job 130. The SOCKETPING report 134 includes a variable sized buffer of text which may consist of a series of white space (space, tab, return) separated clauses in the following preferred format:

BUFFERSIZE=<BufferSize>
[SEQUENCE#=<Sequence#>]
FAMILY=<Family>
PROTOCOL=<Protocol>
ADDRESS=<Address>
[JOBID=<JobID>]
[STATEID<StateID>]
[REASON=<Reason>]
[STATECODE=<StateCode>]
[STATEPARAMETERS=<StateParameters>]
[STATE=<State>]

Where:
- <BufferSize>, <Sequence#>, <Family>, <Protocol>, and <Address> are described above with reference to PJL SOCKETPING command and SOCKETPING reply. <Sequence#> will be omitted if the job status is resulting from a job printed using job retention since the <Sequence#> could cause confusion at the host or print client 122 receiving that sequence number.
- <JobID> is a 32 bit unsigned integer (expressed in ASCII) providing a guaranteed unique number identifying the job. SOCKETPING reports 134 related to the processing of the same job will always have the same <JobID>. The <Sequence#> can also be used as a unique number identifying the job, but only by the host or print client 122 submitting the SOCKETPING job 130. However, since two different hosts or print clients 122 can submit different SOCKETPING jobs 130 having the same <Sequence#>, using the <Sequence#> as a unique job identifier may result in confusion when the printer 128 is queried for job status information. The <Sequence#> value is truly unique only for the particular SOCKETPING job it is associated with. Also, as described above, <Sequence#> is omitted for job status (SOCKETPING reports) reported for retained jobs.
- <StateID> is a 32 bit unsigned integer (expressed in ASCII) providing a guaranteed unique number identifying the current state amongst the sequence of states that are used to process a particular print job (represented by a guaranteed unique <JobID>). While many states may have identical <StateID> values, all of the states required and used for processing a particular print job will have unique <StateID> values for that print job. The <StateID> is used to match entries into a state with exits from a state—including exits from a state because of an error condition.
- <Reason> is an ASCII string representing the reason the SOCKETPING report 134 is being sent. In a preferred embodiment of the invention, the following values are defined for this field:
    "ENTRY"—entry into a new state
    "EXIT"—exit from the indicated state
    "ERROREXIT"—exit from the indicated state resulting from an error condition
- <StateCode> is a 32 bit unsigned integer (expressed in ASCII) identifying the state transition motivating the SOCKETPING report. In a preferred embodiment the following <StateCode> message codes are defined:
    SPSC_RECEIVING_JOB(1000)—printer is receiving a job;
    SPSC_PRINTING_PAGE(1001)—printer is printing a page; page number and copy number are provided by <StateParameters>;
    SPSC_STORING_PAGE(1003)—printer is storing a page (e.g., on a disk); page number is provided by <StateParameters>;
    SPSC_RETRIEVING_PAGE(1004)—printer is retrieving a page (e.g., from a disk); page number provided by <StateParameters>;
    SPSC_JOB_ERROR(2000)—printer encountered an error while processing a job; <StateParameters> identifies the specific error encountered.
- <StateParameters> is a comma separated (without any whitespace) list of 32 bit unsigned integers (expressed in ASCII) providing additional information regarding the supplied <StateCode> message code. The valid values for <StateParameters> depend on the value of <StateCode>. If the <StateParameters> field is not used, the entire STATEPARAMETERS clause may be omitted from the SOCKETPING report. If omitted, the <StateParameters> value is taken to be zero. In a preferred embodiment, the following <StateParameters> correspond to the above defined <StateCode> message codes:
    SPSC_RECEIVING_JOB—not used, should be omitted;
    SPSC_PRINTING_PAGE—first integer should be page number of page currently printing; second integer should be copy number of page currently printing;
    SPSC_STORING_PAGE—first integer should be page number of page being stored;
    SPSC_RETRIEVING_PAGE—first integer should be page number of page being retrieved;
    SPSC_JOB_ERROR—first integer should be a number identifying specific job error; error numbers between 10000 and 19999 (inclusive) have an unspecified nature; error numbers between 20000 and 29999 are recoverable errors; error numbers between 30000 and 39999 are unrecoverable errors; unrecoverable errors cause the print job to abort; in a preferred embodiment, the following error values are specified:
        SPERR_UNSPECIFIED (10000)—generic error with unspecified nature (i.e., not identified as recoverable or unrecoverable);
        SPERR_RECOVERABLE(20000)—generic recoverable error;
        SPERR_PAPER_JAM(20001)—paper jam, recoverable;
        SPERR_OUT_OF_TONER(20002)—out of toner, recoverable;
        SPERR_OUT_OF_PAPER(20003)—out of paper, recoverable;
        SPERR_UNRECOVERABLE(30000)—generic unrecoverable error;
        SPERR_OUT_OF_MEMORY(30001)—out of memory; job is aborted.
    The second integer of the SPSC_JOB_ERROR code will identify the particular <StateID> from which the current error originated. If a first error results in a chain of subsequent errors, the <StateID> will refer to an error state.
- <State> is an optional string providing a text message, English in a preferred embodiment, that is displayed to a user. The string should not be localized; localized strings can be generated from the <StateCode> and <StateParameters> values if necessary. The <State> string is enclosed in quotes to allow spaces to be included in the message. To simplify parsing, quotes are not allowed within the string.

From the foregoing it will be appreciated that, in a preferred embodiment, the present invention provides a novel and advantageous method for establishing two-way communications between a print client and a network printer when the address of the printer is initially unknown to the print client. The method also provides automatic response by the printer to provide print job status reports to the print client and other specified parties without the necessity for an agent to periodic poll the printer or creating unnecessary network traffic.

While having described and illustrated the principles of the present invention with reference to various preferred embodiments and alternatives, it will be apparent to those familiar with the art that the invention can be further modified in arrangement and detail without departing from those principles. Accordingly, it is understood that the present invention includes all such modifications that come within the terms of the following claims and equivalents thereof.

What is claimed is:

1. In a network system, a method of establishing two-way communication between a host system and a device wherein one-way job submission communication between the host system and at least one device has been provided, the device address being initially unknown, the method comprising the steps of:
    submitting a job to a device;
    the job including at least one instruction informing the device of an address of a host system which submitted the job; and
    the device responding to the host system at the host system address and providing at least the device address to the host system.

2. The method of claim 1 wherein the host system address includes a sequence number allowing the host system to distinguish between responses from more than one device.

3. The method of claim 1 wherein the at least one instruction includes an extension for specifying job status reporting for the device.

4. The method of claim 3 wherein job status is defined as a series of successive states, the extension instructing the device to send a job status report as the device transitions from one state to the next state of the job.

5. The method of claim 4 wherein the job includes a plurality of instructions, each of the instructions identifying a different entity address to receive job status reports from the device.

6. The method of claim 5 wherein the extension specifies at least the type of job status reporting desired and the duration of the job status reporting.

7. The method of claim 1 wherein the network system includes at least one device server, the job being submitted to the device server for further transmission to a device.

8. The method of claim 7 wherein the at least one instruction includes an extension for specifying job status reporting request for the device, the device server being adapted for responding to at least a portion of the job status reporting request.

9. The method of claim 1 wherein the job includes only the at least one instruction.

10. In a network system, a method of establishing two-way communication between a print client and a printer wherein one-way job submission communication between the print client and at least one printer on the network system has been provided, the printer address being initially unknown, the method comprising the steps of:
    submitting a print job to a printer;
    the print job including at least one instruction informing the printer of an address of a print client which submitted the print job; and
    the printer responding to the print client at the print client address and providing at least the printer address to the print client.

11. The method of claim 10 wherein the print client address includes a print job sequence number allowing the print client to distinguish between responses from more than one printer.

12. The method of claim 10 wherein the at least one instruction includes an extension for specifying a print job status reporting request for the printer.

13. The method of claim 12 wherein print job status is defined as a series of successive states, the extension instructing the printer to send a print job status report as the printer transitions from one state to the next state of the print job.

14. The method of claim 13 wherein the job includes a plurality of instructions, each of the instructions identifying a different entity address to receive job status reports from the printer.

15. The method of claim 12 wherein the extension specifies at least the type of print job status reporting desired and the duration of the print job status reporting.

16. The method of claim 10 wherein the network system includes at least one print server, the print job being submitted to the print server for further transmission to a printer in the network system.

17. The method of claim 16 wherein the at least one instruction includes an extension for specifying a print job status reporting request for the printer, the print server being adapted for responding to at least a portion of the print job status reporting request.

18. The method of claim 10 wherein the print job includes only the at least one instruction.

19. The method of claim 10 wherein the instruction comprises a print job language (PJL) SOCKETPING command.

20. The method of claim 19 wherein the PJL SOCKETPING command comprises a sequence of predefined values have the following syntax:
    @PJL SOCKETPING
        SEQUENCE=<Sequence#>
        FAMILY=<Family>
        PROTOCOL=<Protocol>
        ADDRESS=<Address>
        PORT=<Port>.

21. The method of claim 20 wherein the printer responds to a received PJL SOCKETPING command with a SOCKETPING reply, the SOCKETPING reply comprising a variable-sized buffer having the following format:
    BUFFERSIZE=<BufferSize>
    SEQUENCE=<Sequence#>
    FAMILY=<Family>
    PROTOCOL=<Protocol>
    ADDRESS=<Address>.

22. The method of claim 20 wherein the PJL SOCKETPING command further comprises a sequence of predefined values and extensions, the extensions defining a print job status report request, having the following syntax:
    @PJL SOCKETPING
        SEQUENCE=<Sequence#>
        FAMILY=<Family>
        PROTOCOL=<Protocol>

ADDRESS=<Address>
PORT=<Port>
[JOBTRACKING=<JobTracking>
[JOBTRACKINGLIFETIME=
<JobTrackingLifetime>]].

23. The method of claim 22 wherein the print job status report comprises a SOCKETPING reply having the following format:
BUFFERSIZE=<BufferSize>
[SEQUENCE#=<Sequence#>]
FAMILY=<Family>
PROTOCOL=<Protocol>
ADDRESS=<Address>
[JOBID=<JobID>]
[STATEID<StateID>]
[REASON=<Reason>]
[STATECODE=<StateCode>]
[STATEPARAMETERS=<StateParameters>]
[STATE=<State>].

* * * * *